(12) United States Patent
Roopnarine (10) Patent No.: US 12,202,631 B2
(45) Date of Patent: Jan. 21, 2025

(54) SERVICING SYSTEMS FOR ON-ORBIT SPACECRAFTS

(71) Applicant: Roopnarine, New York, NY (US)

(72) Inventor: Roopnarine, New York, NY (US)

( * ) Notice: Subject to any disclaimer, the term of this patent is extended or adjusted under 35 U.S.C. 154(b) by 182 days.

(21) Appl. No.: 17/722,605

(22) Filed: Apr. 18, 2022

(65) Prior Publication Data

US 2022/0332443 A1 Oct. 20, 2022

Related U.S. Application Data

(60) Provisional application No. 63/176,573, filed on Apr. 19, 2021.

(51) Int. Cl.
| | | |
|---|---|---|
| *B64G 1/64* | (2006.01) | |
| *B25J 15/00* | (2006.01) | |
| *B25J 19/02* | (2006.01) | |
| *B64G 1/10* | (2006.01) | |

(52) U.S. Cl.
CPC .......... *B64G 1/646* (2013.01); *B25J 15/0066* (2013.01); *B25J 19/02* (2013.01); *B64G 1/1078* (2013.01)

(58) Field of Classification Search
CPC .... B64G 1/1078; B64G 1/646; B64G 1/6464; B64G 1/6462
See application file for complete search history.

(56) References Cited

U.S. PATENT DOCUMENTS

| | | |
|---|---|---|
| 5,174,772 A | 12/1992 | Vranish |
| 6,969,030 B1 | 11/2005 | Jones et al. |
| 10,611,504 B2 | 4/2020 | Halsband et al. |
| 10,850,869 B2 | 12/2020 | Nicholson et al. |
| 11,104,459 B2 | 8/2021 | Sorensen et al. |
| 2019/0168395 A1* | 6/2019 | Hay ........................ H01R 33/00 |
| 2020/0365305 A1* | 11/2020 | Jochum ..................... H01F 7/02 |
| 2021/0284363 A1* | 9/2021 | Licciardello ........... B64G 1/402 |
| 2021/0309397 A1* | 10/2021 | Papantoniou .......... B64G 1/242 |
| 2022/0089301 A1* | 3/2022 | Gregory ................. B64G 1/402 |

* cited by examiner

*Primary Examiner* — Tye William Abell
*Assistant Examiner* — Justin Michael Heston (57) ABSTRACT

A servicing system for on-orbit spacecrafts is disclosed. The system comprises a servicing or host spacecraft configured to perform on-orbit servicing of client spacecrafts. The servicing spacecraft comprises a dedicated, deployable, boom having capture and docking mechanisms. The capture mechanism comprises one or more electromagnets spaced apart and suspended on a frame that may include means for compensating for any out of plane misalignments during capture. The client spacecraft includes a striker plate that covers an area, nominally larger than the footprint of the capture mechanism, that is sized to accommodate a capture envelope determined by the rendezvous and proximity sensing systems. The electromagnets attract the striker plate to capture the client spacecraft in order to provide on-orbit servicing. The docking system has multiple degrees of freedom that are independent of the capture system; docking is accomplished by mechanically coupling the two spacecrafts together, post capture. During docking, electrical and fluid transfer connections may also be accomplished. The servicing spacecraft further comprises a manipulator arm that may be configured to position/align the captured client spacecraft for docking, thereby permitting a very flexible, larger, capture envelope, and reducing operational complexity.

19 Claims, 12 Drawing Sheets

SERVICING SYSTEMS FOR ON-ORBIT SPACECRAFTS

CROSS-REFERENCE TO RELATED APPLICATIONS

This application claims benefit of U.S. Provisional Application No. 63/176,573 filed on Apr. 19, 2021. The entire contents of Application No. 63/176,573 are incorporated by reference

STATEMENT REGARDING FEDERALLY SPONSORED RESEARCH OR DEVELOPMENT

This invention was made with government support under Award ID Number 2001453 awarded by the NSF. The government has certain rights in the invention.

THE NAMES OF THE PARTIES TO A JOINT RESEARCH AGREEMENT

N/A

BACKGROUND OF THE INVENTION

Field of the Invention

The present invention generally relates to spacecrafts. More specifically, the present invention relates to a system, comprising multiple subsystems, that will enable the servicing (repair, de-orbit, salvage, refuel, etc.) of spacecrafts that are orbiting the earth.

Description of Related Art Including Information Disclosed Under 37 CFR 1.97 and 1.98

The ability to assemble, repair, and service on-orbit space assets would realize a key capacity for interplanetary exploration. It would also have significant near-term commercial applications. Spacecraft owners may spend over $1B to build and launch a spacecraft and in rare exceptions, like the Hubble space telescope, these spacecrafts will never be serviced. US government agencies have supported various servicing missions but often at great expense and complexity as most spacecrafts are not designed with on-orbit servicing in mind.

Commercial spacecraft, in particular those in the communications industry, may regularly generate $500 k-$1M per day in revenue so even relatively simple life extension can add tremendous value. Satellites with faulty deployments such as a solar array on antenna may be a total loss, incapable of performing their primary mission, often at the cost of an insurance company. Payouts in excess of $100M are not uncommon. In these instances, on-orbit repair or life extension services, as there are no other options, may be of significant interest to satellite owners and operators.

For these reasons, there is a need for the system disclosed herein, modular, with standardized interfaces, and that can be made compatible with low-cost, ride share launch systems.

BRIEF SUMMARY OF THE INVENTION

The present invention generally discloses servicing systems for spacecraft. Also, the present invention discloses an innovative and intelligent solution that provides a spacecraft servicing system, comprising multiple subsystems, that will enable the servicing (repair, de-orbit, salvage, refuel, etc.) of spacecraft that are orbiting the earth.

According to the present invention, the disclosed system provides a means for performing on-orbit servicing of spacecraft. It features mechanisms that enable a host (or servicing) spacecraft (hereafter, S1) to capture and dock with the spacecraft to be serviced (hereafter, S2) and a robotic (manipulator) arm that can provide repairs, change-outs, etc.

In one embodiment, the spacecraft servicing system comprises a servicing spacecraft or host spacecraft configured to perform on-orbit servicing of client spacecrafts. In one embodiment, the servicing spacecraft comprises a dedicated deployable boom having a capture mechanism at its distal end. The capture mechanism comprises one or more electromagnets spaced apart and suspended on a frame that allows for some spherical displacements as a way of compensating for any out of plane misalignments during capture. A compression spring is configured to provide compliance and slightly preload the spherical (or rod-end) bearing that supports the frame in a nominal position. In one embodiment, the client spacecraft includes a striker plate that covers an area larger than the footprint of the capture mechanism. The electromagnets on the host spacecraft attract the striker plate to capture the client spacecraft in order to enable on-orbit servicing. In one embodiment, the spacecraft servicing system further comprises a manipulator or robotic arm configured to position/align the captured client spacecraft for docking, thereby permitting a very flexible, larger, capture envelope and reducing operational complexity.

In one embodiment, the client spacecraft comprises a standard client interface (SCI) having a BNC-styled receptacle to mate with a docking probe on the host spacecraft; at least one electrical connector half coupled with the opposite half on the docking interface plate (located on S1); one or more striker plates to permit electromagnetic capturing by the host spacecraft, and one or more alignment holes to guide one or more alignment pins during docking in order to compensate for any misalignment along the roll axis of the two spacecrafts.

In one embodiment, the SCI includes three discrete pads spaced in an array that nominally matches the spacing on the electromagnets. The discrete pads' dimensions are determined to allow capturing with the maximum possible misalignment between the host and client spacecrafts within the capture envelope or zone. The capture envelope is determined by a sensor system used to rendezvous and bring the spacecrafts together for proximity operations, and the ability to control movement of the host spacecraft.

The electromagnets may induce out of plane (pitch and yaw) positional corrections of S1 if they include one or more sensors for sensing the flux density flowing through a yoke of the magnetic circuit. Deenergizing the electromagnets, after docking is achieved, enables the release and separation of the two spacecrafts after servicing. The boom further comprises a docking mechanism configured to dock the host spacecraft with the client spacecraft.

The docking mechanism has four degrees of freedom and is recessed below the plane of the electromagnets of the capture mechanism in the stowed position. In one embodiment, the docking mechanism is mounted on two orthogonal linear slides or stage, each of which can be driven independently, in order to compensate for misalignment in the plane (X-Y) of the striker plate. The docking mechanism includes an electrical connection to the client spacecraft configured to perform diagnostic tests, extract or exchange data, etc.

The host spacecraft docking system uses a bayonet-styled coupling system or BNC-styled probe and receptacle to structurally connect the two spacecrafts and to permit the transfer of torques to roll the client spacecraft about the longitudinal axis of the boom, thereby permitting the boom to position the periphery of the client spacecraft in any location to facilitate a repair task by the manipulator arm. Rotations of the probe half of the bayonet-styled coupling system on the host spacecraft produce motion internal to the coupling (receptacle) half of the client spacecraft. This relative motion structurally preloads the two spacecrafts together, and allows for potential mating of connectors to provide both electrical continuity and a leakproof fluid connection to enable re-fueling of the client spacecraft. Furthermore, the internal movements of elements inside of S2 may also be used to actuate valves.

The manipulator arm is equipped with various collision avoidance sensors. The manipulator arm is paired with a number of end effectors to perform specific repair tasks. The manipulator arm comprises a sensor and vision system configured to locate potential attachment points on the client spacecraft. The host and client spacecrafts are undocked or separated by rotating the docking probe in the reverse direction which resets the internal mechanisms on the client spacecraft. Separation springs, integrated into either the docking or capture mechanisms, are used to exert a force on the client spacecraft in order to positively enable physical separation of the two spacecrafts.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWING(S)

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

In general, the disclosed system 100 provides a means for performing on-orbit servicing of spacecrafts. It features mechanisms that enable a host (or servicing) spacecraft (hereafter, S1) 102 to capture and dock with the spacecraft to be serviced (hereafter, S2) 104 and a robotic (manipulator) arm 108 that can provide repairs, change-outs, etc. FIGS. 1-16 exemplarily illustrates the working of spacecraft servicing systems, according to different embodiments of the present invention.

Figure 1:
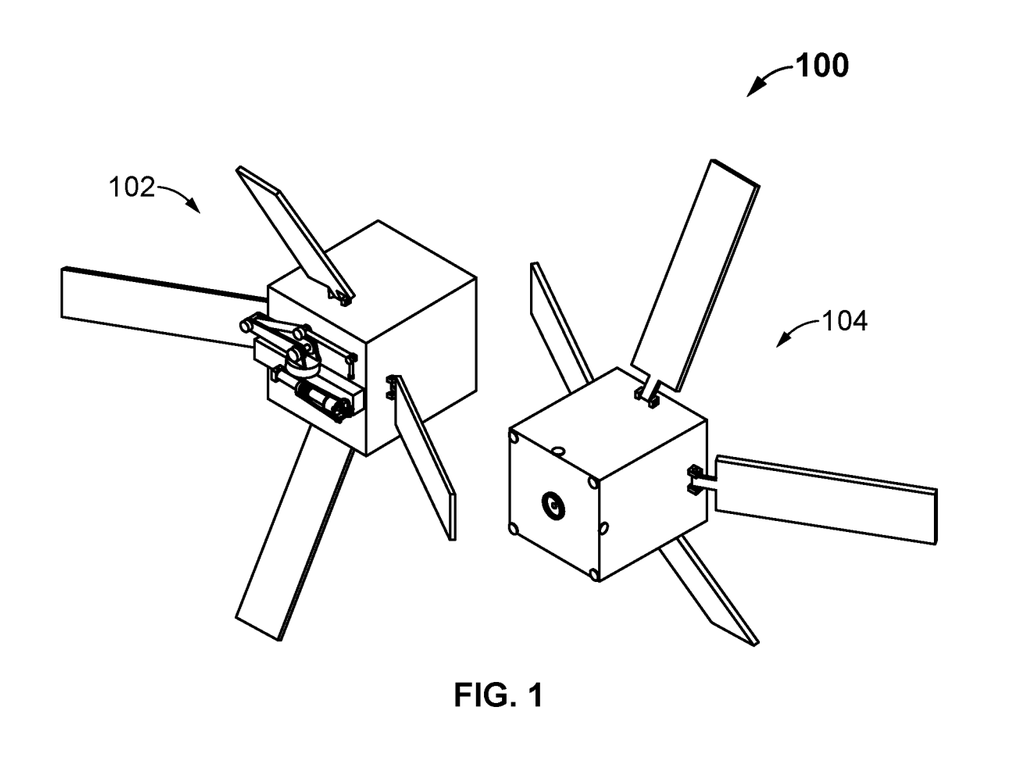
FIG. 1 shows a nominal configuration of two spacecrafts of a servicing system in an embodiment of the present invention.

Referring to FIG. 1, a nominal configuration of the two spacecrafts (102 and 104) of the servicing system 100, according to one embodiment of the present invention. In the figures showing S1 102, the manipulator arm 108 is depicted in a stowed position (it will be recognized that a number of orientations of the arm are possible); in this position, the tool change mechanism will be preloaded to a ground (spacecraft) structure which is not shown.

Figure 2:
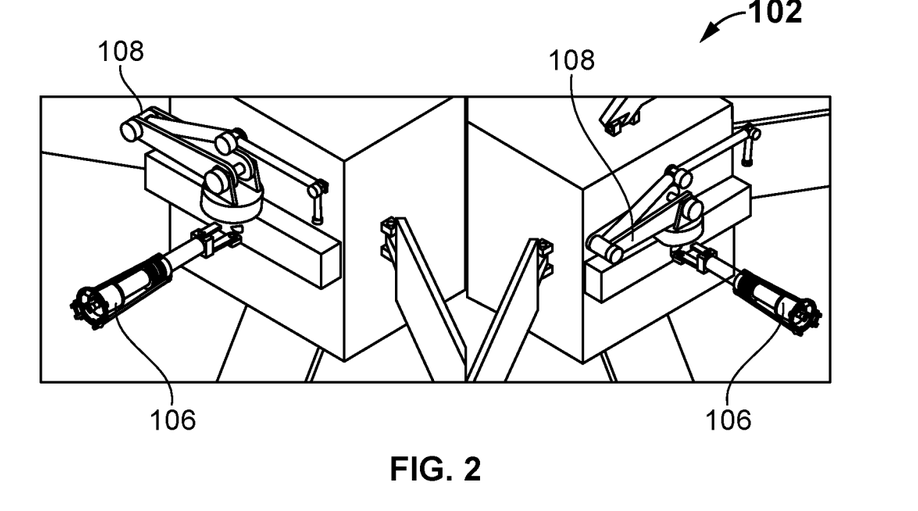
FIG. 2 shows an enlarged view of a servicing spacecraft or host spacecraft (S1) in one embodiment of the present invention.
Figure 3:
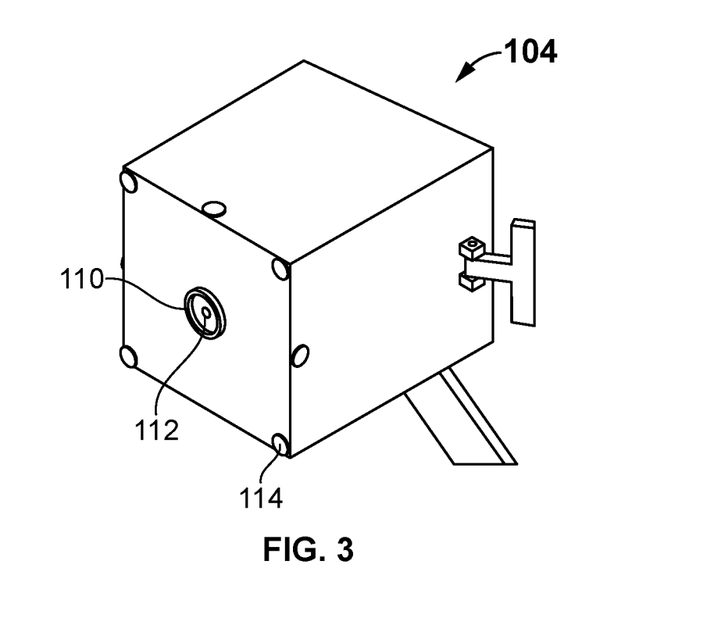
FIG. 3 shows an enlarged view of a spacecraft to be serviced, or client spacecraft, (S2) in one embodiment of the present invention.

Referring to FIGS. 2 and 3, an enlarged view of the host spacecraft 102 and client spacecraft, S2 104 of the servicing system 100 respectively, according to one embodiment of the present invention. It will be evident that the disclosed system 100 has the following novel features and advantages over the state-of-the-art each of which will enable it to be simpler and lightweight: it includes a kinematically simple, serially configured, robot arm; it comprises a capture mechanism that is independent of a docking mechanism and vice-versa; it eliminates the need for guidance cones in order to either capture or dock, these increase volume and mass; it may use the manipulator arm 108 to position (align) the captured spacecraft for docking, and this permits a very flexible, larger, capture envelope and reduces operational complexity. Additional novel features and advantages include: the system 100 may incorporate re-fueling capability into the docking mechanism to eliminate the need for hose management, etc.; there is no need for active (motorized) components to capture or dock on the spacecraft to be serviced, S2 104; the use of the manipulator arm 108 to deploy the capture/docking boom 106 could eliminate the need for active deployment mechanisms on the boom 106; and, incorporation of a roll axis about the boom 106 increases the work envelope or reach of the manipulator arm 108 without adding complexity. Finally, the servicing vehicle, S1 102 may be packaged for ride-share capability with the Evolved Expendable Launch Vehicle (EELV) Secondary Payload Adapter (ESPA). To emphasize, each of the items above is unique to the disclosed servicing system 100 and taken together, represents an ambitious and comprehensive approach to on-orbit servicing.

Figure 4:
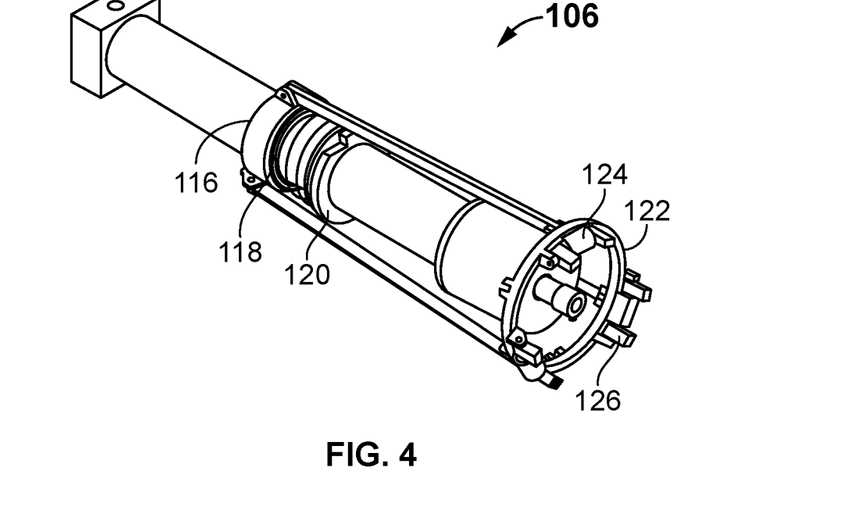
FIG. 4 shows a capture mechanism of a boom in one embodiment of the present invention.
Figure 5:
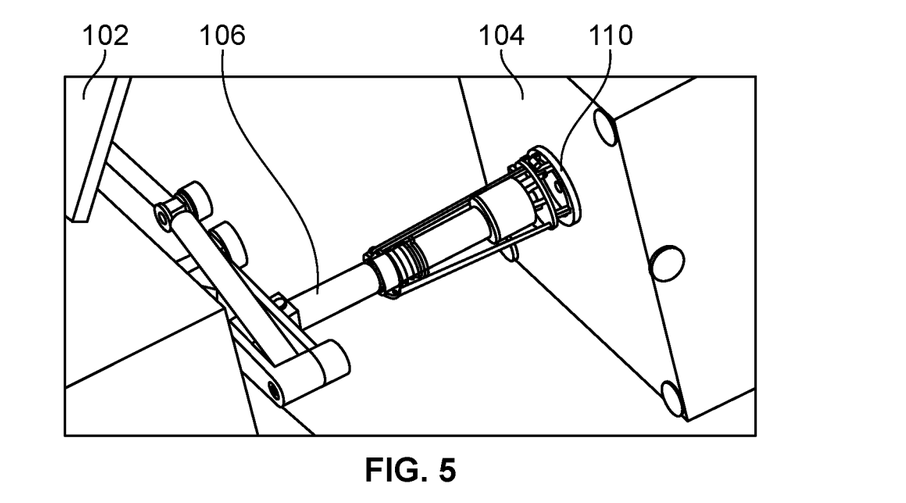
FIG. 5 shows the two spacecrafts in a captured position in one embodiment of the present invention.

Capture:

In order for any servicing to occur, the host spacecraft, S1 102 needs to first capture the client spacecraft, S2 104, to be serviced. For this purpose, the host spacecraft S1 102 carries a dedicated boom that is deployed on orbit. At the end of the boom 106 is the capture mechanism as shown in FIG. 4. The capture mechanism is comprised of 3 electromagnets spaced or arrayed, ideally, 120 degrees apart. The electromagnets are suspended on a frame 122 that allows for some spherical displacements as a way of compensating for any out of plane misalignments during capture.

Figure 6A:
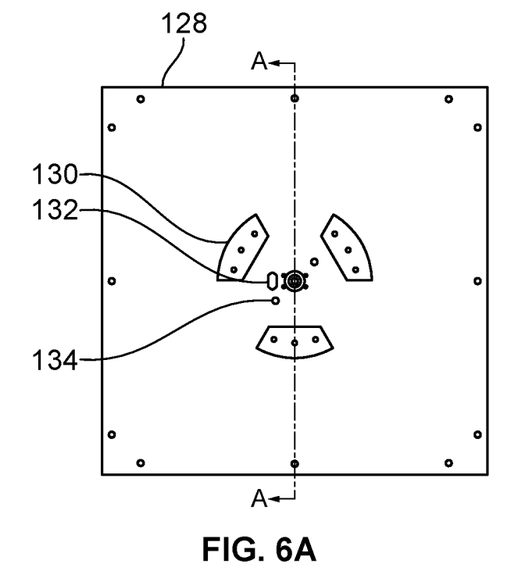
FIGS. 6A-6C show the capture and docking interfaces on the client spacecraft in one embodiment of the present invention.

The boom 106 comprises a spherical "rod end" bearing 116 and a spring preload collar 120. A compression spring 118 is used to lightly preload the electromagnets on frame 122 in their nominal position. Alternatively, three tension springs, attached to the frame 122, can be used for the same purpose. Additionally, flex pivots or flexures (not shown in figures) may be used to preload the coil 124 and yoke assembly 126 of the electromagnets such that, if the assembly approaches the striker plate 110 (shown in FIG. 3) out of plane, the magnetic poles will self-align to be perpendicular to the striker plate 110. The striker plate 110 is located on the client spacecraft, S2 104 and may be annular in construction; however, to reduce mass, it may simply be discrete pads 130 as shown in FIG. 6A, equal in number to the electromagnets and arrayed similarly. The striker plate (this reference hereafter, refers to the discrete pads or a single annular plate) 110 may cover an area larger than the footprint of the capture mechanism, that is, the arrayed electromagnets, in order to allow for imprecise or misaligned capturing.

The dimensions of the annular area of the striker plate 110 are an important factor in providing position information and guidance for capture. The striker plate 110 is made from a ferromagnetic material such that the energized electromagnets induce an attractive force on the striker plate 110 and thus the spacecraft to be captured. The boom 106 may be deployed by active (motorized, springs; not shown in figures) or a passive means. The latter can only occur if the host spacecraft 102 includes a manipulator arm 108, described later, which will be used to deploy the boom 106. In all scenarios, once the boom 106 is deployed, it is locked or latched in position (these features are not depicted in the figures).

The electromagnet-based capture mechanism/system relies on state-of-the-art sensing systems to rendezvous the spacecrafts and to bring them into a close enough alignment and proximity for the capture system to be effective. Once the spacecrafts (102 and 104) are in close enough proximity to enable capture, all subsequent operations can be done automatically and without imparting any disorienting impulses on either spacecraft.

In order to reduce power consumption, the function of the electromagnets for and during capture may be replaced by permanent magnets; however, the electromagnets will be used to enable the release and separation of the two spacecrafts (102 and 104) after servicing. During capture, the electromagnets are also used to induce out of plane positional corrections, in either scenario. Regardless of the configuration used, permanent or electromagnet, the magnetic capture system may include a means for sensing the flux density flowing through the yoke 126 of the magnetic circuit. Normally, these sensors (for example, hall effect sensors) will all have identical measurements; when brought into near contact (near capture) with striker plate 110, unless the magnetic poles are normal to the striker plate 110, the sensed flux density values will differ. These measurements can be used in conjunction with other alignment sensors to globally adjust the position of the host spacecraft, S1 102 with respect to the striker plate 110 of the client spacecraft, S2 104 or, they can be used to make adjustments to the capture assembly locally (that is, with respect to the boom). In the latter case, increasing and/or decreasing the power into the three electromagnets, independently, will produce the desired adjustments and this can be done automatically by using a feedback loop.

Capture Interface:

As noted above, capturing of the client spacecraft, S2 104 by host spacecraft 102 is accomplished by an interface 112 (shown in FIG. 3) located on client spacecraft, S2 104. This interface 112 could be made into a standardized feature on spacecrafts in order to allow for the possibility of on-orbit servicing. The client spacecraft, S2 104 further includes one or more possible "hard" attachment points 114 for the manipulator arm 108. In one embodiment, the interface 110 includes three discrete pads 130 (shown in FIG. 6A) that are ferromagnetic, spaced in an array that nominally matches the spacing on the electromagnets. The dimensions of the pads 130 are determined so as to allow capturing with the maximum possible misalignment between the two spacecrafts (102 and 104), that is, within the capture envelope or zone. The capture envelope, in turn, is determined by the sensor system used to rendezvous and bring the spacecrafts (102 and 104) together for proximity operations, and the ability to control movements of the servicing spacecraft, S1 102.

The pads 130 may be offset to project from the plane of the spacecraft's structure 128, distance "g", they are mounted on; in this configuration, the gap, g, between the pad 130 and the structure creates another interface to which docking, and capturing, is possible. Specifically, a three-pronged grapple can be inserted into the space between the pads 130, once they are below the capture surface and in gap g, between the pads 130 and the spacecraft structure 128, rotating these prongs will essentially capture the spacecraft. Additional rotation of the grappling prongs, will preload the connection between the two spacecrafts. This feature may be particularly useful to permanently attach a payload, an avionics box, for example, to client spacecraft, S2 104. If the capturing mechanisms are grappling, rather than electromagnet, then there is no need for a ferromagnetic, striker plate 110, and the only features that matter are those that will enable the grappling mechanism to interface and lock.

In one embodiment, a further modification to the striker plate 110, whether an annular plate or discrete pads 130, may be instituted in order to achieve rotational alignment between the two spacecrafts (102 and 104). This embodiment will include projections from the striker plate 110 that may be considered "teeth" as in the salient poles of an electric motor. Similarly, the electromagnet may be considered as having two salient poles (per yoke); thus, energizing the electromagnet and moving it into close proximity with the striker plate will produce a torque on the client spacecraft, S2 104, that will seek to align the poles on the two spacecrafts (102 and 104). This feature will, therefore, automatically compensate for rotational (or roll) misalignments during capture.

Another arrangement of the striker plate 110 is that in which it is embedded to be flush with, or recessed into, the surface of the plane on which it is mounted, for example, structure 128. While this configuration eliminates the possibility of using grappling prongs to dock and capture the spacecraft, the ability to have the salient poles described above will remain.

Figure 6B:
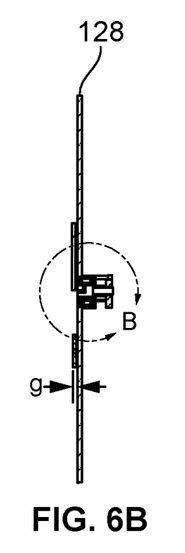
Figure 6C:
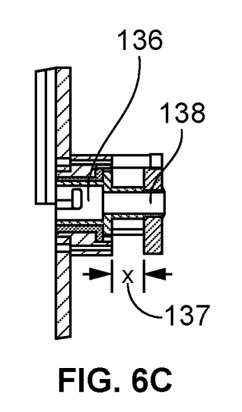
Figure 7:
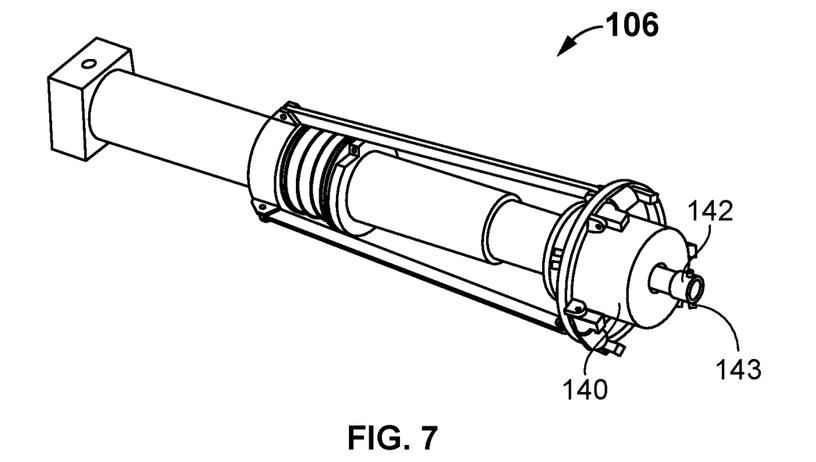
FIG. 7 shows the boom with an extended docking mechanism in one embodiment of the present invention.

Docking:

In addition to the capture mechanism, also located on the boom 106 is a mechanism that enables host spacecraft, S1 102 to dock with client spacecraft, S2 104; this system is independent of the capture mechanism. Docking is accomplished when the bayonet-styled tabs 143 on boom 106 on host spacecraft, S1 102 engage with slots 137 on the threaded receptacle 136 on the client spacecraft, S2 104; this interface may be concentrically located with the center of the striker plate 110 used for capture but an offset is also possible. Detail B, FIG. 6C, shows a cross-section of the docking elements on the client spacecraft, S2 104. The docking mechanism may have four degrees of freedom and is normally recessed below the plane of the electromagnets of the capture mechanism in the stowed position. The first degree of freedom is an axial translation, along the length or longitudinal axis of the boom 106, the second, which may be eliminated, is a rotation or roll about the same axis and the third and fourth are orthogonal translational movements in a plane (X-Y) that is perpendicular to the roll or longitudinal axis. The axial translational motion drives the docking or coupling mechanism into a position beyond the capture mechanism, as shown in FIG. 7, in which it can engage with the other half of the docking mechanism on the client spacecraft, S2 104.

Figure 8:
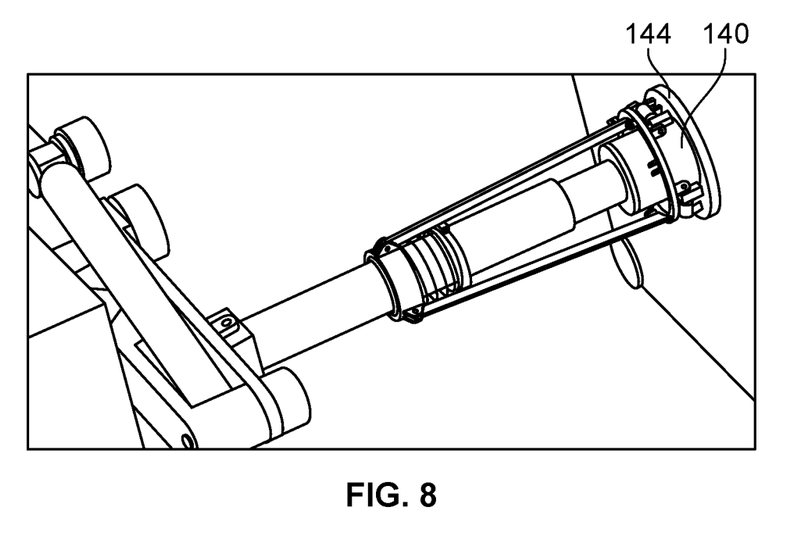
FIG. 8 shows the spacecrafts in the docked position in one embodiment of the present invention.

Referring to FIG. 8, the two spacecrafts (102 and 104) are in docked position, according to one embodiment of the present invention. In this embodiment, the docking mechanism 140 is in its extended position, which creates a gap 144 between the electromagnets' yoke and the striker plate 110. To enable docking, the electromagnets of the capture mechanism will be energized (or alternatively, when it is included, the manipulator arm 108 on the host spacecraft, S1 102 may position the client spacecraft, S2 104 for docking, after it has been captured); once docking is completed, the electromagnets are de-energized. There are a number of ways in which the vehicles can be docked or held together, for example, using spring loaded detents or latches that, potentially, interface with the gap g, of FIG. 6B or any of the peripheral surfaces of the striker plate. The preferred approach, however, is to use a bayonet-styled coupling system (as in a BNC connector) with the receptacle half 136 located on S2. The probe-receptacle bayonet connection can also be designed to permit the transfer of torques to roll S2 about the longitudinal axis of the boom 106, if this feature is desired. This, in turn, will permit the boom 106 to position the periphery of S2 104 in any location to facilitate a repair task by the manipulator arm 108. The X, Y movements allow for compensation of misalignments in the plane of the striker plate 110, for example, when the capture mechanism is not aligned with the docking feature on the client spacecraft, S2 104. X, Y movements are accomplished by mounting the docking mechanism on two linear slides, or stage, and driving (motorizing) each independently. Another possible configuration of the various axes is one in which only one of the X or Y axis is present; in this case, a roll axis about the boom axis must also be present.

Internal to the bayonet-styled connection receptacle half 136 are additional mechanisms; specifically, rotation of the S1 102 probe coupling half during docking will produce motion internal to the coupling half of S2 104 which could be a cam/follower action or more simply, a nut and threaded stud engagement as shown in FIG. 6C. These relative motions can be used to, potentially, mate connectors but more specifically, to open port(s) and to achieve a fully mated, leakproof, connection that enables refueling of the client spacecraft, S2 104. One way to transfer fuel across the connection would be by centrally locating, in the docking mechanism, a means of connecting to a refuel supply line on the host spacecraft, S1 102. This line will be flexible (a hose, for example) or otherwise be articulated in order to enable the boom to be stowed. In this arrangement, there will be no need to separately manage a refueling hose or the like which further reduces complexity and mass.

Figure 9:
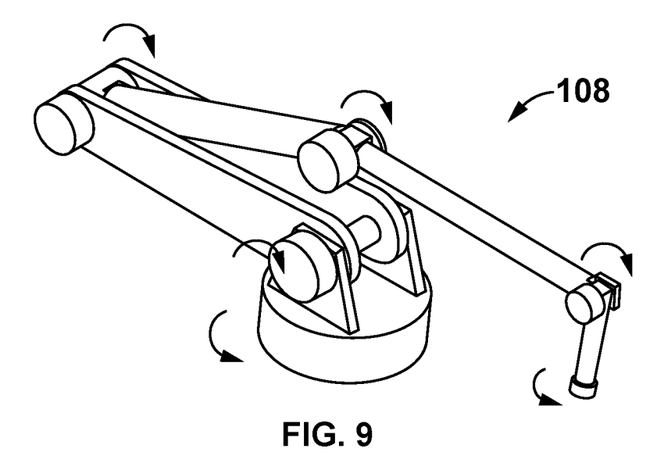
FIG. 9 shows a manipulator arm in one embodiment of the present invention.
Figure 10:
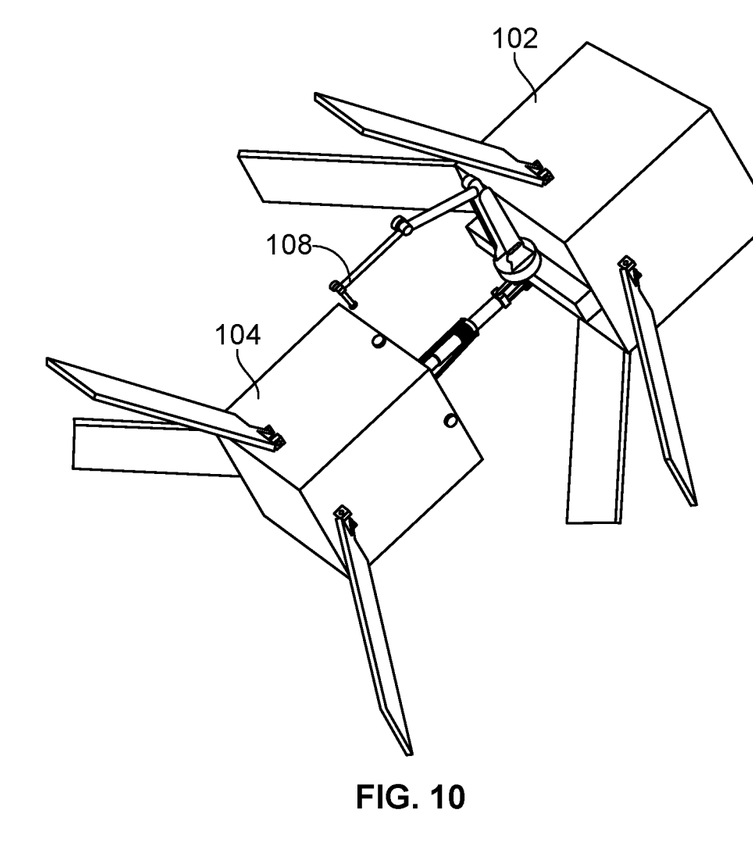
FIG. 10 shows the docked spacecrafts with manipulator arm to perform a task in one embodiment of the present invention.
Figure 11:
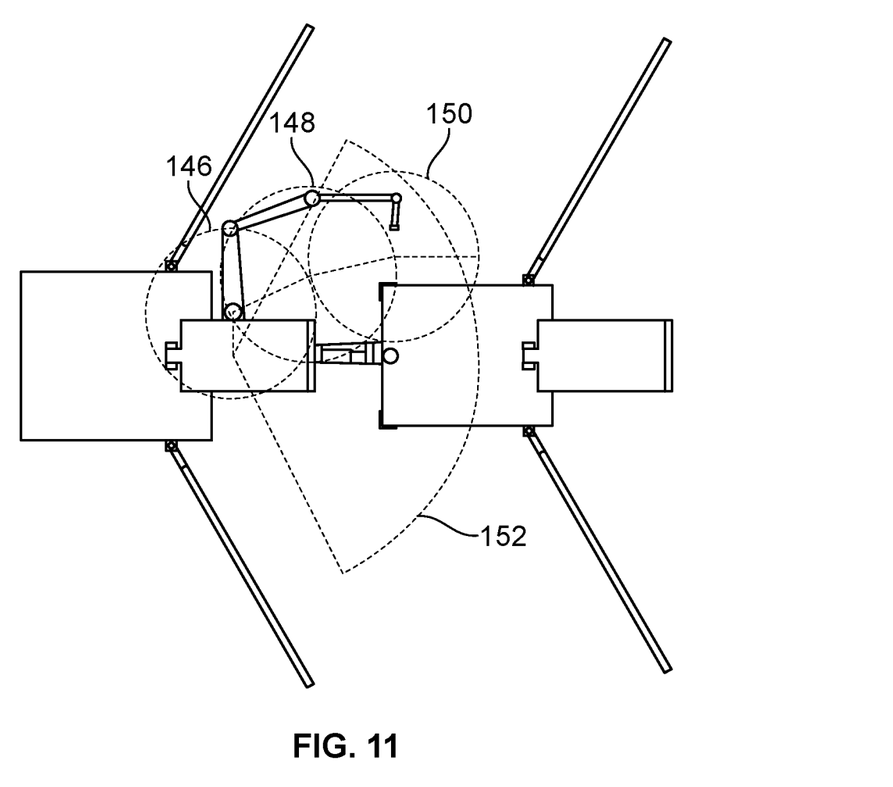
FIG. 11 shows an arm reach envelope in one embodiment of the present invention.
Figure 12:
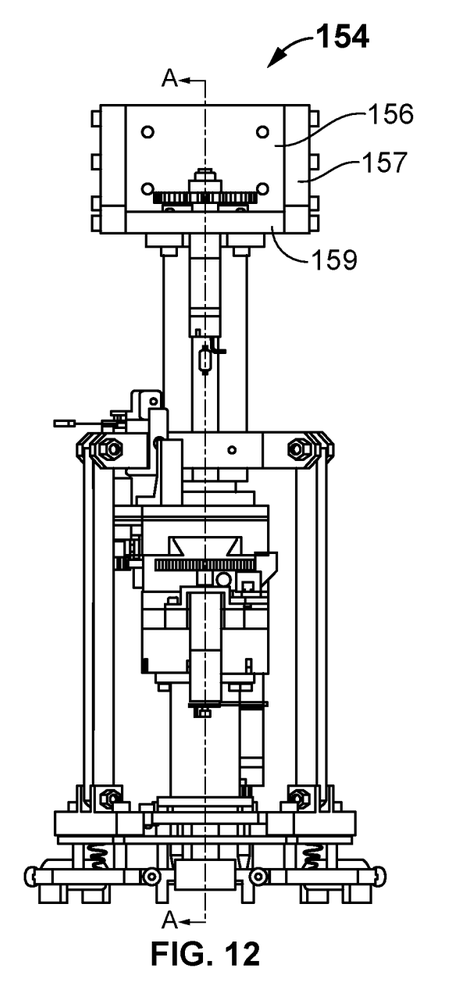
FIGS. 12-16 show various views of the servicing system in one embodiment of the present invention.
Figure 13:
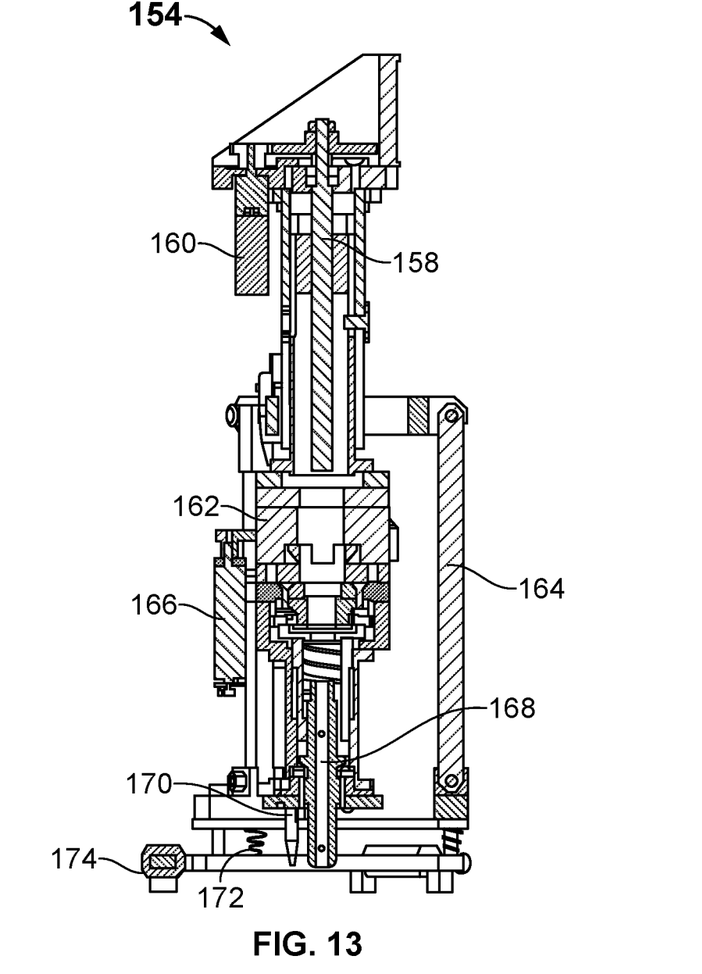
Figure 14:
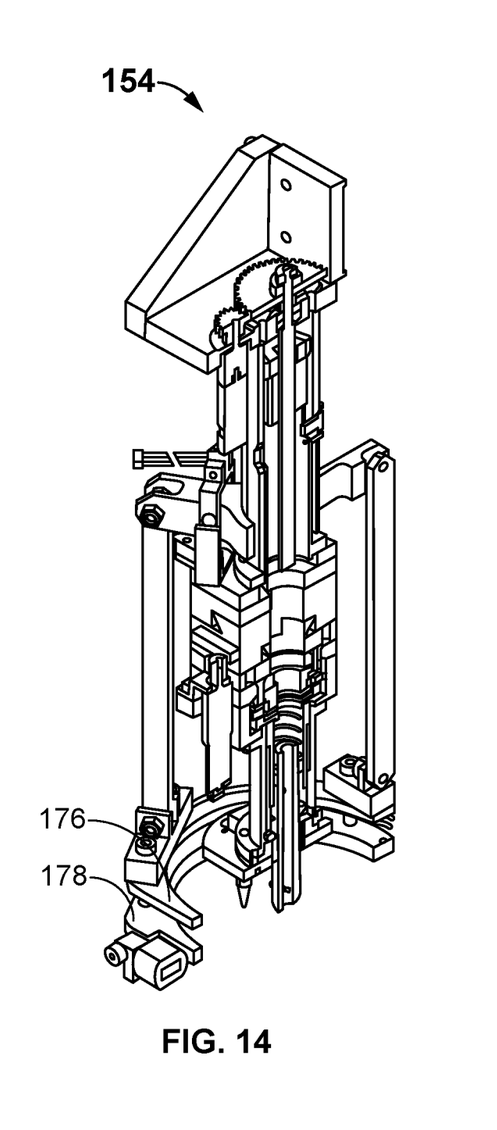
Figure 15:
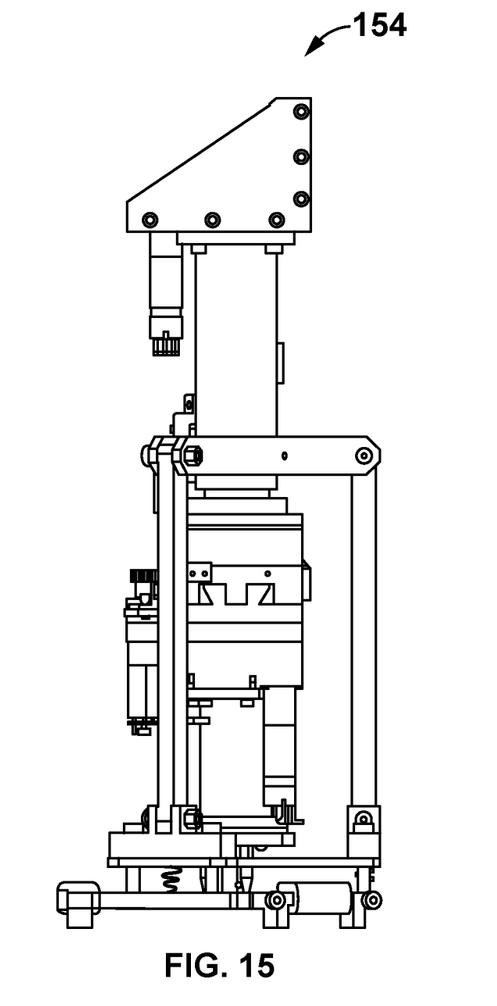
Figure 16:
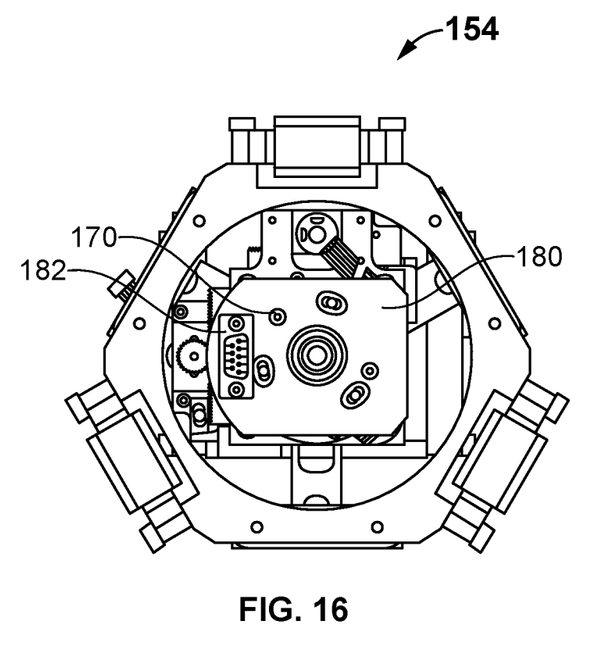

Manipulator Arm:

FIGS. 9-11 exemplarily illustrates the operation of the manipulator arm 108, according to one embodiment of the present invention. In the simplest configuration of the host spacecraft, S1 102, a manipulator arm 108 is included. FIG. 9 shows a possible configuration of a six degree of freedom arm with arrows indicating the possible motions (146, 148, 150, and 152) at the six joints (it should be understood that the arrows indicate movement in both directions about the identified axes). The manipulator arm 108 is equipped with various collision avoidance sensors and may incorporate hardstop features to prevent it from damaging its host spacecraft, S1 102.

As depicted in FIG. 9, the manipulator arm 108 has the familiar, conventional, layout of a robot and as such, its kinematics is well known and defined for simple operations; again, reducing complexity. This is in direct contrast to the state-of-the-art. Clearly many variations on the geometric layout and location of the arm on S1 102 are possible. Ultimately, the manipulator arm 108 is paired with a number of end effectors each of which is designed to perform specific repair tasks. These end effectors are stored in a suite of holsters from which they can be retrieved and stowed by the manipulator arm 108. In one embodiment, the manipulator arm 108 is equipped with a tool-change mechanism that interfaces with the various end effectors each of which has a common interface for compatibility. Located in various positioned on the client spacecraft, S2 104 are interfaces 112 (depicted in FIG. 3) that are identical to that on the end effectors; which enables the manipulator arm 108 on the host spacecraft, S1 102 to "grab" or hold the client spacecraft, S2 104; if needed.

In one embodiment, a sensor and vision system on the manipulator arm 108 will be used to locate potential attachment joints on the client spacecraft, S2 104. If the alignment of the mating elements on the spacecrafts (102 and 104), after capture, does not permit their engagement, the client spacecraft, S2 104 can be re-positioned by the manipulator arm 108 in order to achieve alignment and therefore, docking. This repositioning will follow a sequence in which the manipulator arm 108 on the host spacecraft, S1 102 takes hold of the client spacecraft, S2 104 in a hand-off from the capture mechanism. The deployed boom 106 is at a fixed reference with respect to the manipulator arm 108; consequently, the manipulator arm 108 is able to position the client spacecraft, S2 104 in an optimum alignment location to permit docking. This operational feature may be useful in order to reduce complexity associated with the initial alignment of the two vehicles and the capture of the client spacecraft, S2 104. This attribute of the system may be useful in that it greatly expands the capture zone (defined by the striker plate) by simply increasing the size of the striker plate 110.

FIG. 10 depicts the manipulator arm 108 in the deployed (that is, not stowed) position in which it is ready to perform any repair task; an end effector is not shown. FIG. 11 shows the possible work envelope for this specific configuration. To reiterate, the docking mechanism may include the ability to roll S2 about the boom 106. This feature dramatically increases the reach of the manipulator arm to any surface on the periphery of the spacecraft without increasing the complexity of the manipulator arm 108 itself. If need be, the translational axis degree of freedom of the boom 106 may be implemented to further increase the reach of the manipulator arm 108 but this may be redundant in that the several geometries of the manipulator arm 108 and boom 106 can be optimized to eliminate this need. However, it is obviously possible to add further degrees of freedom (pitch or yaw, for example) and complexity to the boom 106 in order to fully maximize robot reach and operations.

As noted, it is clear from the preceding description that the entire on-orbit servicing system 100 may be configured and deployed in different configurations. A first configuration, will simply be with a deployable boom 106 that features capture, docking and refueling mechanisms. In this configuration, the boom 106 will necessarily be actively deployed (springs or motorized). Another configuration which includes the manipulator arm 108 will enable other repairs or activities. However, the docking mechanism may include an electrical connection 132 to the client spacecraft, S2 104 that can be used to perform diagnostic tests, extract or exchange data, etc. Inclusion of the manipulator arm 108 will, necessarily, include a suite of tools; this will enable full functionality for the execution of repairs on the client spacecraft, S2 104.

The following is a description, with related figures, of one specific embodiment of the capturing, and docking systems, reduced to practice and sized for an ESPA-class payload. It should be noted that this disclosure does not limit the invented systems to ESPA-class payload compatibility. Consequently, each element may be sized according to the requirements of a particular mission and compatibility with the contemplated launch vehicle.

Referring to FIGS. 12-16, various views of the spacecraft servicing system 100, according to different embodiments of the present invention. The spacecraft servicing system 100 uses at least three mounting brackets (156, 157, and 159) for demonstration. The docking mechanism 154 includes a leadscrew 158 to achieve a first degree of freedom (Z-axis). The capture mechanism 154 is comprised of three electromagnets assembly 174 suspended on a frame that is mechanically grounded to the servicing spacecraft, S1 102. Each electromagnet has 200 turns of #21 AWG wire wrapped around a yoke. These are attached to an intermediate frame/plate 178 that is separated from a ground frame/plate 176 by three conical (tapered) coil springs or separation springs 172. The intermediate frame/plate 178 is free to move axially with respect to the ground frame/plate 176, compressing the conical springs 172 when it does. The strength of the electromagnet is obviously a function of distance from the striker plate 110; each is designed to hold 3 lb at capture (that is, a total of 9 lbf at distance zero). The entire capture system is mechanically grounded to the host spacecraft 102 via three struts 164 attached to the ground plate 176.

The docking system 154 is mounted on an X, Y stage 162 in order to achieve two more degrees of freedom; each of these axes is driven independently. The stage 162 permits final alignment of the male docking probe (FIG. 12) with the female receptacle, shown in detail in FIGS. 6A-C. FIGS. 6A-C also show the developed design for a "Standard Client Interface" (SCI). The interface includes the BNC-styled receptacle 136 that mates with the docking probe 168, an electrical connector half 132 that is coupled with the opposite half on the docking interface plate (see FIG. 16), the striker plates for the capture system, and alignment holes that guide the alignment pins 170 during docking in order to compensate for any misalignments along the roll axis.

The docking system 154 has an x-axis actuator 166 and z-axis actuator 160. After capture, docking is accomplished when the docking probe 168 is inserted by the z-axis (vertical) actuation mechanism 160, into the receptacle 136 and rotated. Because of the threaded interface 138 between the receptacle 136 and the housing, rotating the former advances it into the housing by distance, x. Distance x is also the nominal spacing between the intermediate 178 and ground plates 176; thus, the conical springs are compressed by this same distance during docking. The movement, x, is also intended to produce internal actuations on the client spacecraft, S2 104, specifically, opening of a port(s) in order to form a continuous, leakproof, path for refueling (note that the docking probe 168 has a through hole or alignment pin hole 134 that can form a part of the fuel delivery path). Further, the rear side of the docking system 154 includes a docking interface plate 180 having a D-sub 9 pin connector 182 (representative of an electrical connection) and one or more alignment pins 170.

To unlock or separate the two spacecrafts (102 and 104) following an on-orbit servicing activity, the docking probe 168 is rotated in the reverse direction which resets the internal mechanisms on the client spacecraft, S2 104, this is the position shown in detail B of FIG. 6. The compressed conical springs exert a force on the client spacecraft, S2 104, thus, enabling the physical separation of the two spacecrafts (102 and 104) as distance x is traversed. Finally, the docking probe 168 is retracted to its stowed position by using the mechanisms of the z-axis actuator 160.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A spacecraft servicing system, comprising: a servicing or host spacecraft configured with a capture mechanism, a docking mechanism, and a robotic arm, to perform on-orbit servicing of a client spacecraft: wherein the capture and docking mechanisms are mounted on the distal end of a deployable boom with said boom having at least one degree of freedom, relative to the servicing spacecraft, to permit a stowed configuration for launch with said at least one degree of freedom fixed, relative to the servicing spacecraft, following boom deployment on-orbit; wherein the capture mechanism comprises one or more electromagnets circumferentially spaced apart and axially positioned at the extremity of the boom to make initial capturing contact with the client spacecraft when said electromagnets are energized on entering a capture zone; wherein the client spacecraft includes a striker plate that covers an area nominally larger than the footprint of the capture mechanism, wherein the initial contact between the spacecrafts is made when the energized electromagnets attract the striker plate to capture the client spacecraft to permit docking and react loads transmitted during this process, and for providing on-orbit servicing, wherein the electromagnets are compliantly suspended on a frame, affixed to the boom, to compensate for any out of plane misalignments during capture, wherein the electromagnets are de-energized, post docking; wherein the docking mechanism is comprised of a Bayonet Neill-Concelmen (BNC)-styled connector probe that is mated, post capture, with a receptacle on the client spacecraft in order to dock and structurally join the two spacecrafts together; and a manipulator arm or robotic arm configured with an end-effector to position/align the captured client spacecraft for docking, thereby permitting a larger capture envelope and reducing operational complexity.

2. The spacecraft servicing system of claim 1, wherein the client spacecraft comprises a standard client interface (SCI) having:
- one or more striker plates, nominally circumferentially spaced as the electromagnets, to form an interface to enable capture by the electromagnets of the host spacecraft;
- a BNC-styled receptacle to mate with the docking probe located on the host spacecraft;
- an electrical connector half to be coupled with the opposite half on the docking interface plate located on the host spacecraft;
- and one or more alignment holes to guide one or more alignment pins during docking to passively compensate for any misalignment along a roll axis between the two spacecrafts, and to react torque loads generated during the docking process.

3. The spacecraft servicing system of claim 1, wherein the electromagnets induce out of plane positional corrections.

4. The spacecraft servicing system of claim 1, wherein the electromagnets include one or more sensors for sensing the flux density flowing through a yoke of the electromagnetic circuit.

5. The spacecraft servicing system of claim 1, wherein the electromagnets enable the release and separation of the two spacecrafts after servicing.

6. The spacecraft servicing system of claim 1, wherein the docking mechanism includes one half of an electrical connector to form an electrical connection to the client spacecraft configured to perform diagnostic tests, extract or exchange data.

7. The spacecraft servicing system of claim 1, wherein the bayonet-styled coupling system or BNC-styled probe and receptacle permit the transfer of torques to roll the client spacecraft, post docking, about the longitudinal axis of the boom, thereby permitting the boom to position the periphery of client spacecraft in any location to facilitate a repair task by the manipulator arm.

8. The spacecraft servicing system of claim 1, wherein the manipulator arm is equipped with various collision avoidance sensors.

9. The spacecraft servicing system of claim 1, wherein the manipulator arm is paired with a number of end effectors to perform specific repair tasks.

10. The spacecraft servicing system of claim 1, wherein the manipulator arm comprises a sensor and vision system configured to locate potential attachment joints on the client spacecraft.

11. The spacecraft servicing system of claim 1, wherein the host and client spacecrafts are undocked or separated by rotating the docking BNC-styled probe in the reverse direction which resets the internal mechanisms on the client spacecraft.

12. The spacecraft servicing system of claim 1, further consisting of one or more compression or flexure springs integrated into either the docking mechanism or capture mechanism, configured to exert a force on the client spacecraft to positively enable undocking and physical separation of the two spacecrafts.

13. The spacecraft servicing system of claim 1, wherein the striker plate covers an area larger than the footprint of the capture mechanism, i.e., the electromagnets spaced in an array to accommodate in plane misalignments.

14. The spacecraft servicing system of claim 13, wherein the capture envelope is determined by a sensor system used to rendezvous and bring the spacecrafts together for proximity operations, and the ability to control movements of the host spacecraft.

15. The spacecraft servicing system of claim 1, wherein the docking mechanism is configured to axially translate with respect to the capture mechanism in order to enable insertion of the BNC-styled probe on the host spacecraft into the receptacle of the client spacecraft.

16. The spacecraft servicing system of claim 15, wherein the docking mechanism has multiple degrees of freedom with respect to the boom, and is recessed proximally from the plane of the electromagnets of the capture mechanism in the stowed position.

17. The spacecraft servicing system of claim 16, wherein the docking mechanism is mounted on two orthogonal linear slides or stage with each being capable of being driven independently for compensating misalignment in the plane of the striker plate.

18. The spacecraft servicing system of claim 15, wherein, post insertion and during docking, rotations of the bayonet-styled probe on the host spacecraft are transmitted to the opposite coupling half or receptacle on the client spacecraft with such rotations of said receptacle half producing relative motions internal to the coupling half on the client spacecraft.

19. The spacecraft servicing system of claim 18, wherein the relative motion allows for mating of the electrical connector halves to provide a complete electrical connection, and a fully mated, leak-proof fluid connection to enable re-fueling of client spacecraft.

* * * * *